(12) United States Patent
Green et al.

(10) Patent No.: US 6,382,182 B1
(45) Date of Patent: May 7, 2002

(54) FUEL INJECTOR ADAPTOR FOR CONVERSION OF SINGLE ENGINES TO DUAL FUEL ENGINES

(75) Inventors: Christopher Green, Toronto; Jakub Hurnik, Rockwood; James Mancuso, Waterloo; Richard Schiedel, Kitchener, all of (CA)

(73) Assignee: GFI Control Systems Inc., Kitchener (CA)

( * ) Notice: Subject to any disclaimer, the term of this patent is extended or adjusted under 35 U.S.C. 154(b) by 0 days.

(21) Appl. No.: 09/384,107

(22) Filed: Aug. 27, 1999

(51) Int. Cl.[7] ............................................. F02M 55/02
(52) U.S. Cl. .................................... 123/420; 125/575
(58) Field of Search ........................... 123/470, 525, 123/575, 27 GE

(56) References Cited

U.S. PATENT DOCUMENTS

| | | | | |
|---|---|---|---|---|
| 1,687,672 A | * | 10/1928 | Lang | 123/470 |
| 4,519,371 A | * | 5/1985 | Nagase et al. | 123/470 |
| 4,527,516 A | | 7/1985 | Foster | 123/27 |
| 4,846,126 A | | 7/1989 | Stannard | 123/308 |
| 5,058,554 A | * | 10/1991 | Takeda et al. | 123/456 |
| 5,564,663 A | * | 10/1996 | Hardy et al. | 239/533.2 |
| 5,592,924 A | | 1/1997 | Audiosio et al. | 123/252 |
| 5,623,907 A | * | 4/1997 | Cotton et al. | 123/456 |
| 5,713,336 A | | 2/1998 | King et al. | 123/525 |

* cited by examiner

Primary Examiner—Willis R. Wolfe
Assistant Examiner—Mahmoud Gimie
(74) Attorney, Agent, or Firm—Gowling Lafleur Henderson LLP

(57) ABSTRACT

An adaptor for adapting a seat of an engine capable of using a first fuel and having a seat for receiving a first fuel injector means with a discharge nozzle for flowing the first fuel, comprising a body having a bore with side walls for receiving the first fuel injector means, a plurality of spaced apart protuberances extending from the sidewalls for limiting movement of the discharge nozzle, an inlet for receiving a second fuel, and an adaptor hole for communicating with the discharge nozzle and the inlet, the adaptor hole being formed through a portion of the body which is to be fitted within the seat of the engine originally provided for receiving the first fuel injector means. The adaptor can be used to modify an existing engine using the first fuel such that the engine can use both the first fuel and a second fuel.

20 Claims, 4 Drawing Sheets

FUEL INJECTOR ADAPTOR FOR CONVERSION OF SINGLE ENGINES TO DUAL FUEL ENGINES

FIELD OF INVENTION

The present invention relates to a fuel adaptor for an internal combustion engine and, more particularly, to an adaptor, to facilitate engine operation with either of or both gasoline and an alternative fuel, such as LPG (liquid petroleum gas) or CNG (compressed natural gas),

BACKGROUND OF THE INVENTION

Various fuel injector adaptors are known which facilitate adapting a gasoline injection engine so that it can be supplied selectively with gasoline and/or an alternative fuel, such as LPG or CNG, with no required change to the engine block of the engine. Examples of such adaptors are disclosed in U.S. Pat. Nos. 5,713,336 and 5,592,924. Typically, such injector adaptors receive and seat separate gasoline and alternative fuel injection devices. The adaptors are mounted in apertures within the intake manifold of the engine (or, alternatively, the intake port of each combustion chamber in the engine) for communication therewith, in lieu of the gasoline injection devices originally provided with the engine.

In some cases, it is necessary or preferred to seat the gasoline fuel injector in the adaptor so that the injector remains at or near its original position within the engine. An example of this manner of seating a gasoline fuel injector is disclosed in FIG. 6B of U.S. Pat. No. 5,713,336. To effect this seating arrangement in the adaptor, the discharge nozzle of the gasoline fuel injector must be spaced from the inner side walls of the adaptor to provide a passage for flowing the alternative fuel from its corresponding injection device, through an adaptor outlet hole, and to the engine. Because the discharge nozzle is spaced from the inner side walls of the adaptor to thereby permit flow of the alternative fuel in the interstitial space, there is opportunity for lateral movement of the discharge nozzle in response to engine vibrations resulting from normal operation. If that happens, the discharge nozzle may become oriented such that injected fuel impinges on surrounding structures, thereby losing speed, before entering the intake manifold (or intake port, as the case may be). In such circumstances, fuel is not properly delivered to the combustion chamber, thereby compromising engine performance.

SUMMARY OF INVENTION

To overcome the aforesaid disadvantages of prior art adaptors, an adaptor for adapting a seat of an engine capable of using a first fuel and having a seat for receiving a first fuel injector means with a discharge nozzle for flowing the first fuel is provided. Such adaptor comprises a body having a bore with side walls for receiving the first fuel injector means, a plurality of spaced apart protuberances extending from the sidewalls thereof for limiting movement of the discharge nozzle, an inlet for receiving a second fuel, and an adaptor hole for communicating with the discharge nozzle and the inlet, the adaptor hole being formed through a portion of the body which is to be fitted within the seat of the engine originally provided for receiving the first fuel injector means. The protuberances can extend radially from the side walls. The protuberances can also extend from a region of the side walls opposite the discharge nozzle of the fuel injector means. To this end, the protuberances limit lateral movement of the discharge nozzle. The protuberances can also surround the discharge nozzle. The discharge nozzle can have an exterior surface defining a perimeter, and each of the protuberances can be radially spaced from the perimeter at spaced intervals around the perimeter. The fuel injector means can be seated in the adaptor such that the discharge nozzle is disposed below the inlet associated with the second fuel, and the protuberances are spaced apart for flowing the second fuel from the inlet to the adaptor outlet hole. The discharge nozzle has an outlet and the outlet is aligned with the adaptor outlet hole. Each of the at least one combustion chamber has an intake port and the adaptor is mounted on the intake port for communication of the adaptor outlet hole with the intake port. Alternatively, the engine can have an intake manifold and the adaptor is mounted on the intake manifold for communication of the adaptor outlet hole with the intake manifold.

The present invention also provides an engine capable of using a first fuel having at least one combustion chamber, and adapted to use both the first fuel and a second fuel, comprising a first fuel injector means, associated with each of the at least one combustion chamber, the fuel injector having a discharge nozzle at one end for flowing the first fuel to a corresponding one of the at least one combustion chamber, an adaptor, associated with each of the at least one combustion chamber, for adapting a seat of the engine originally provided for receiving the first fuel injector means, comprising a body having a bore with side walls for receiving and seating the fuel injector means, a plurality of spaced apart protuberances extending from the side walls for limiting movement of the discharge nozzle of the first fuel injector means, an inlet for receiving the second fuel, and an adaptor outlet hole, communicating with the discharge nozzle and the inlet, the adaptor outlet hole being formed through a portion of the body which is to be fitted within a seat of the engine originally provided for receiving the first fuel injector means.

By having protuberances extending from the side walls of the adaptor, the discharge nozzle of a first fuel injector can be restricted, while permitting flow of a second fuel from a second fuel injector in spaces between the protuberances. This is particularly advantageous where it is necessary to position the first fuel injector such that its discharge nozzle is not spaced from the adaptor outlet while requiring that passages remain for flowing the second fuel from the second fuel injector.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION

The present invention relates to a novel adaptor for an internal combustion engine to facilitate engine operation with either of or both gasoline and an alternative fuel, such as LPG or CNG, with no substantial change to the structure of the engine. More particularly, an adaptor is provided and fitted within a seat of an engine, originally provided for receiving a gasoline fuel injection device, for flowing either of or both gasoline and an alternative fuel from corresponding fuel injection devices and for receiving and restricting movement of one of the fuel injection devices therein.

Figure 1:
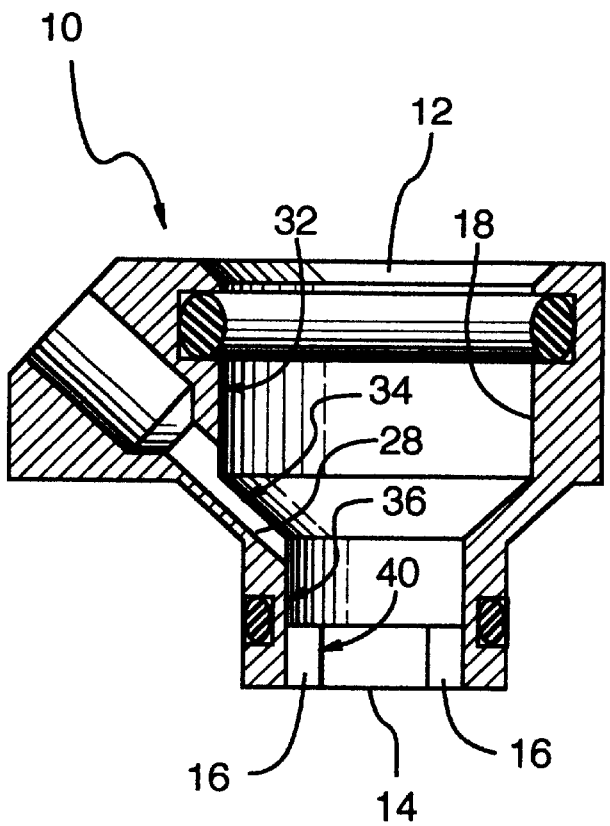
FIG. 1 is a side elevation view, partly in section, of an adaptor of the present invention.
Figure 2:
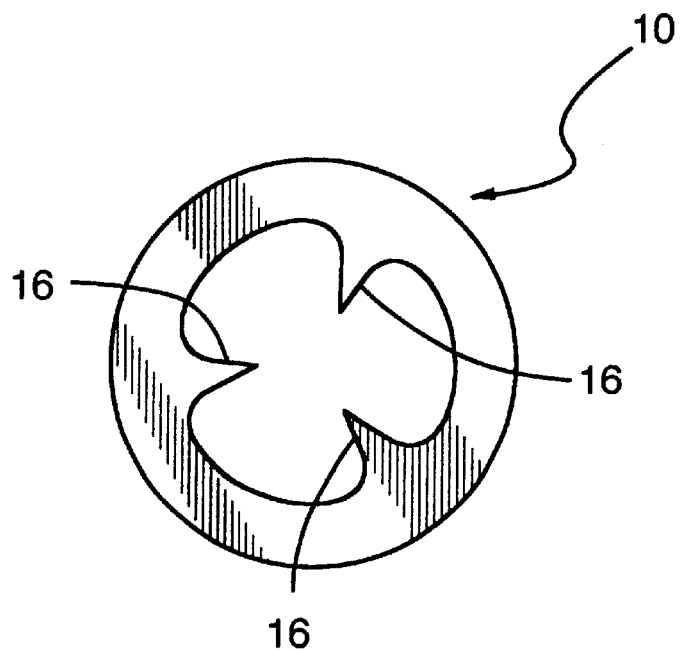
FIG. 2 is a bottom plan view of the outlet end of an adaptor of the present invention.

Referring to FIGS. 1, 2, 3, and 5, an adaptor 10 is provided comprising a body having a bore 12 for receiving and seating a first fuel injector 20 (see FIGS. 3 and 5) of an internal combustion engine. The first fuel injector 20 has a discharge nozzle 22 formed at its lower end 24 which communicates with an outlet hole 14 of the adaptor 10. Preferably, the discharge nozzle 22 has an outlet 22a which is substantially vertically aligned with the outlet hole 14. Referring to FIG. 2, the bore 12 has side walls 18 from which extend a plurality of spaced apart protuberances 16. The protuberances 16 act as stop members for limiting the movement of the discharge nozzle 22 of the fuel injector 20. Such movement may be caused by typical vibrations occurring during normal engine operation.

The discharge nozzle 22 includes an elongated housing 26 having an exterior surface. When the first fuel injector 20 is seated in the adaptor 16, the exterior surface of this elongated housing 26 is substantially normal or oblique relative to the axis of each of the protuberances 16.

The protuberances 16 can extend radially from a region of the side walls 18 radially opposite the exterior surface of the nozzle housing 26. In the embodiment illustrated in FIG. 2, the protuberances 16 have distal ends which are radially spaced but in close proximity to the nozzle housing 26. More preferably, the protuberances 16 surround the discharge nozzle 22 such that lateral movement of the discharge nozzle 22 is restricted in substantially all directions. To this end, the protuberances 16 can be spaced apart at regular intervals around a perimeter of the nozzle housing 26, such perimeter defined by the exterior surface of the nozzle housing 26. To further stabilize the discharge nozzle 22, the distal ends of the protuberances 16 can be positioned proximate to an external surface of the housing 26 which is proximate to a location at which the first fuel exits the first fuel injector 20.

Alternatively, the distal ends of the spaced apart protuberances 16 can contact the exterior surface of the nozzle housing 26. Such arrangement also limits lateral movement of the discharge nozzle 22.

Figure 5:
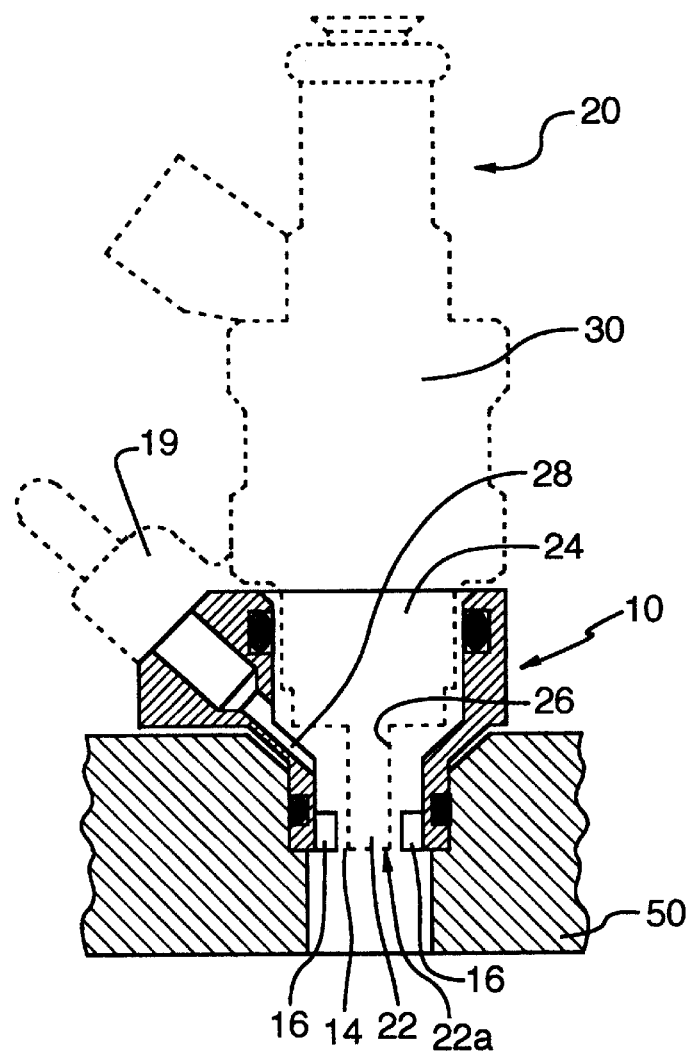
FIG. 5 is a side elevation view, partly in section, of a second embodiment of an adaptor fitted within an engine block showing a fuel injector disposed within the adaptor in hidden lines.

The side walls 18 of the adaptor bore 12 are further provided with an inlet 28 for receiving a second fuel from a second fuel injector 19 (See FIG. 5). The inlet 28 also communicates with the adaptor outlet hole 14 for flowing the second fuel into the engine.

The disposition of the first fuel injector 20 in the adaptor 10 will now be more particularly described. The first fuel injector 20 comprises a main body 30, for containing a valve portion, and a discharge nozzle 22, wherein the diameter of the discharge nozzle 22 is smaller than that of the main body 30. To facilitate flow of the first fuel from the first fuel injector and the second fuel from the second fuel injector, the adaptor bore 12 comprises a first section 32, a second section 34, a third section 36 and a fourth section 40 (See FIG. 1). The first section 32 has an effective diameter to receive insertion of the first fuel injector 20 while providing sufficient clearance between the first side wall portion of the first section 32 and the first fuel injector 20 to create a snug fit between the first fuel injector 20 and the first side wall portion of the first section 32.

Vertically disposed below the first section 32 is the second section 34. The second section 34 is adapted for effecting seating of the first fuel injector 20 in the adaptor 10. In this respect, the second section 34 is characterized by a smaller diameter than the first section 32 such that a shoulder 38 is provided to seat the first fuel injector 20 while permitting the discharge nozzle 22 to extend below the shoulder 38 into the third section 36. The diameter of the nozzle 22 of the first fuel injector 20 is, therefore, necessarily smaller than that of the second section 34.

In the embodiment shown in FIG. 1, the second section 34 comprises a second side wall portion which is tapered inwardly relative to the first side wall portion of the first section 32, thereby forming a shoulder 38 for seating of the first fuel injector at a point where the diameter of the second section 34 is smaller than a diameter of the first fuel injector 20.

The third section 36 of the bore 12 has a third side wall portion which has an opening to form the inlet 28 for the second fuel. The third section 36 of the bore 12 has a diameter greater than that of the discharge nozzle 22, thereby providing a flow passage for flowing the second fuel, such flow passage being defined by the exterior surface of the discharge nozzle housing 26 and the third side wall portion.

Figure 3:
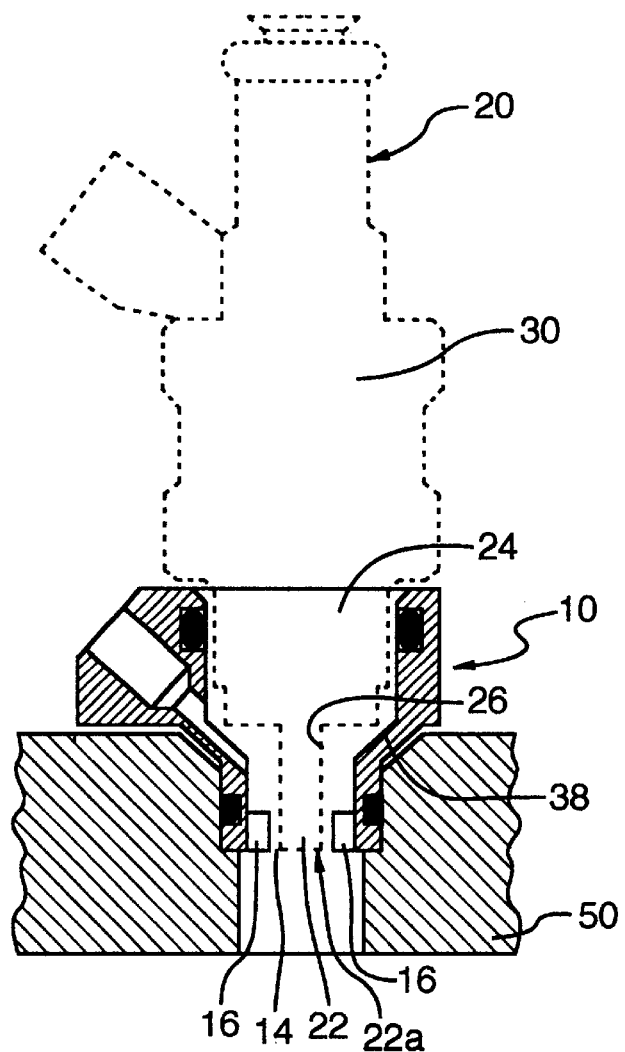
FIG. 3 is a side elevation view, partly in section, of an adaptor fitted within an engine block showing a fuel injector disposed within the adaptor in hidden lines.
Figure 4:
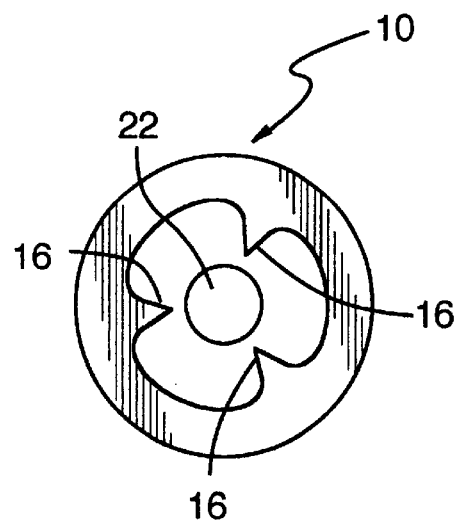
FIG. 4 is a bottom plan view of the adaptor of FIG. 3 showing a fuel injector disposed therein.

Vertically disposed below the third section 36 is a fourth section 40 characterized by a fourth side wall portion having spaced-apart protuberances 16 extending therefrom. Referring to FIGS. 3 and 4, the protuberances 16 extend radially from the fourth side wall portion and have distal ends which are radially spaced but in close proximity to the discharge nozzle 22. Alternatively, the distal ends of spaced apart protuberances 16 can contact the external surface of the nozzle housing 26 (see FIGS. 5 and 6). The spaces between the protuberances 16 provide flow passages 42 (see FIG. 2) for flowing the second fuel from the third section 36 to the adaptor outlet 14, thereby permitting communication between the inlet 28 and the adaptor outlet 14.

Figure 7:
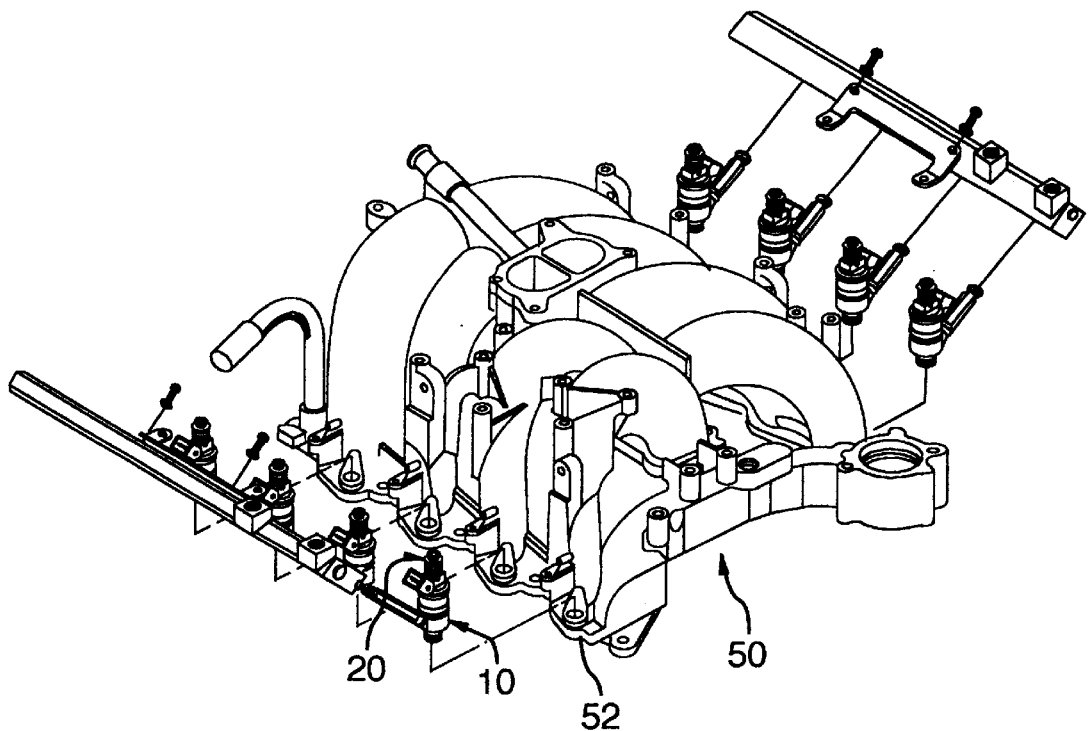
FIG. 7 is an exploded view of an adaptor receiving a fuel injector and adapted for disposition in an internal combustion engine.
Figure 8:
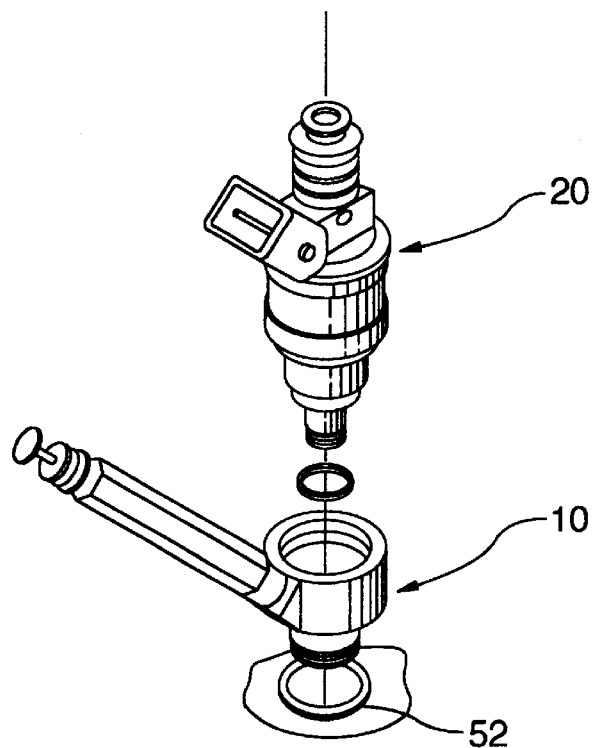
FIG. 8 is a second exploded view of an adaptor receiving a fuel injector and adapted for disposition in a seat of an internal combustion engine.

Referring to FIGS. 7 and 8, in one embodiment, the adaptor 10 is fitted within a seat 52 of an engine 50 originally provided for receiving a fuel injector. In this respect, the adaptor 10 may be mounted in an aperture within the intake manifold of the engine 50. Alternatively, the adaptor may be mounted directly in the intake port of a combustion chamber of the engine 50. To facilitate flow of the first and second fuels, the adaptor outlet hole 14 is formed through a portion of the adaptor 10 which is to be fitted within a seat of the engine 50 originally provided for receiving a fuel injector. This, therefore, enables communication between the engine 50 and each of the first fuel injector and the second fuel injector.

In some cases, it is necessary or, at least, preferred that the adaptor does not affect the hydrodynamic characteristics of the first fuel flowing from the first fuel injector. In this respect, the discharge nozzle must be positioned at or near the adaptor outlet and, preferably, spaced as little as possible from the adaptor outlet. The adaptor of the present invention facilitates positioning of the discharge nozzle of a fuel injector in this manner while also providing a fluid passage for flowing a second fuel through the adaptor outlet and into the engine.

Figure 6:
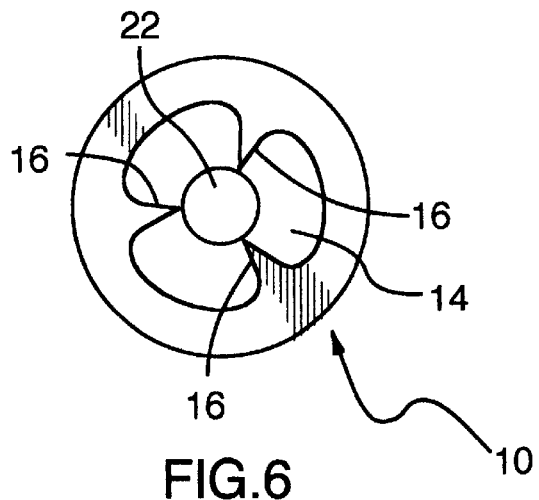
FIG. 6 is a bottom plan view of the adaptor of FIG. 5 showing a fuel injector disposed therein.

FIG. 6 shows one particular configuration for the protuberances 16 which are evenly spaced about an inner circumference of outlet hold 14. Other configuration will immediately be apparent to those skilled in the art.

The adaptor can be useful where it is required to convert a single-fuel engine, using the first fuel injected by a fuel injector, into a duel fuel engine using first and second fuels. In this respect, the first fuel injector can be the fuel injector for which a seat was originally provided in the engine. The second fuel injector can be seated in the adaptor or can be remotely located from the adaptor. In the latter case the outlet of the second injector must be connected to the inlet of the adaptor by a hose or other conduit to facilitate remote communication between the second injector outlet and the adaptor inlet.

The first fuel can include gasoline. In this respect, the first fuel injector can be a gasoline fuel injector. The second fuel can be an alternative fuel such as LPG or CNG. The engine can be adapted to operate selectively with either gasoline or the alternative fuel.

It will be understood, of course, that modifications can be made in the embodiments of the invention described herein without departing from the scope and purview of the invention as defined by the appended claims.

We claim:

1. An adaptor for adapting a seat of an engine capable of using a first fuel and having an adaptor seat for receiving a first fuel injector means with a discharge nozzle for flowing the first fuel, comprising:
    a body including a bore with side walls for receiving the first fuel injector means;
    a plurality of spaced apart protuberance, each of the protuberances extending from the sidewalls and terminating at a distal free end, for limiting movement of the discharge nozzle;
    an inlet for receiving a second fuel; and
    an adaptor hole for communicating with said discharge nozzle and said inlet, said adaptor hole being formed through a portion of said body which is to be fitted within the seat of the engine originally provided for receiving the first fuel injector means.

2. The adaptor of claim 1 wherein said protuberances extend radially from said side walls.

3. The adaptor of claim 2 wherein said protuberances extend from a region of said side walls opposite said discharge nozzle of said fuel injector means.

4. The adaptor of claim 3 wherein said protuberances limit lateral movement of said discharge nozzle.

5. The adaptor of claim 3 wherein said protuberances surround said discharge nozzle.

6. The adaptor of claim 3 wherein said discharge nozzle has an exterior surface defining a perimeter, and each of said protuberances being radially spaced from said perimeter at spaced intervals around said perimeter.

7. The adaptor of claim 3 wherein said fuel injector means is seated in said adaptor such that said discharge nozzle is disposed below said inlet associated with said second fuel, and said protuberances are spaced apart for flowing said second fuel from said inlet to said adaptor outlet hole.

8. The adaptor of claim 3 wherein said discharge nozzle has an outlet and said outlet is substantially vertically aligned with said adaptor outlet hole.

9. The adaptor of claim 3 wherein each of said at least one combustion chamber has an intake port and said adaptor is mounted on said intake port for communication of said adaptor outlet hole with said intake port.

10. The adaptor of claim 3 wherein said adaptor has an intake manifold and said adaptor is mounted on said intake manifold for communication of said adaptor outlet hole with said intake manifold.

11. An engine capable of using a first fuel having at least one combustion chamber, and adapted to use both the first fuel and a second fuel, comprising:
    a first fuel injector means, associated with each of said at least one combustion chamber, said fuel injector having a discharge nozzle at one end for flowing the first fuel to a corresponding one of said at least one combustion chamber;
    an adaptor, associated with each of said at least one combustion chamber, for adapting a seat of the engine originally provided for receiving said first fuel injector means, comprising:
    a body including a bore with side walls for receiving and seating said fuel injector means;
    a plurality of spaced apart protuberances, each of the protuberances extending from said side walls and terminating at a distal free end, for limiting movement of said discharge nozzle of said first fuel injector means;
    an inlet for receiving the second fuel; and
    an adaptor outlet hole, communicating with said discharge nozzle and said inlet, said adaptor outlet hole being formed through a portion of said body which is to be fitted within a seat of the engine originally provided for receiving said first fuel injector means.

12. The engine of claim 11 wherein said protuberances extend radially from said side walls.

13. The engine of claim 12 wherein said protuberances extend from a region of said side walls opposite said discharge nozzle of said fuel injector means.

14. The engine of claim 13 wherein said protuberances limit lateral movement of said discharge nozzle.

15. The engine of claim 13 wherein said protuberances surround said discharge nozzle.

16. The engine of claim 13 wherein said discharge nozzle has an exterior surface defining a perimeter, and each of said protuberances being radially spaced from said perimeter at spaced intervals around said perimeter.

17. The engine of claim 13 wherein said fuel injector means is seated in said adaptor such that said discharge nozzle is disposed below said inlet associated with said second fuel, and said protuberances are spaced apart for flowing said second fuel from said inlet to said adaptor outlet hole.

18. The engine of claim 13 wherein said discharge nozzle has an outlet and said outlet is substantially vertically aligned with said adaptor outlet hole.

19. The engine of claim 13 wherein each of said at least one combustion chamber has an intake port and said adaptor is mounted on said intake port for communication of said adaptor outlet hole with said intake port.

20. The engine of claim 13 wherein said engine has an intake manifold and said adaptor is mounted on said intake manifold for communication of said adaptor outlet hole with said intake manifold.

* * * * *